US012242374B2

(12) United States Patent
Palmer

(10) Patent No.: US 12,242,374 B2
(45) Date of Patent: Mar. 4, 2025

(54) LOGICAL ADDRESS GRANULARITY CONFIGURATIONS FOR LOGICAL ADDRESS SPACE PARTITIONS

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 164 days.

(21) Appl. No.: 17/892,535

(22) Filed: Aug. 22, 2022

(65) Prior Publication Data

US 2024/0061767 A1 Feb. 22, 2024

(51) Int. Cl.
*G06F 12/02* (2006.01)
(52) U.S. Cl.
CPC .................. *G06F 12/023* (2013.01)
(58) Field of Classification Search
CPC ..................................................... G06F 12/023
See application file for complete search history.

(56) References Cited

U.S. PATENT DOCUMENTS

| | | | | |
|---|---|---|---|---|
| 2014/0013059 A1* | 1/2014 | Joshi | ..................... | G06F 9/5077 |
| | | | | 711/144 |
| 2015/0242324 A1* | 8/2015 | Novakovic | ......... | G06F 12/0813 |
| | | | | 711/121 |
| 2018/0189174 A1* | 7/2018 | Chou | .................. | G06F 12/0246 |
| 2021/0026781 A1* | 1/2021 | Dong | .................. | G06F 12/0246 |
| 2022/0129189 A1* | 4/2022 | Zhou | ....................... | G06F 12/06 |

* cited by examiner

*Primary Examiner* — David Yi
*Assistant Examiner* — Nicholas A. Paperno
(74) *Attorney, Agent, or Firm* — Lowenstein Sandler LLP

(57) ABSTRACT

A system includes a memory device associated with a logical address space, and a processing device, operatively coupled to the memory device. The processing device can provide, to a host system, usable capacity information and supported logical address granularity information for the logical address space. The processing device can obtain, from the host system, a logical address granularity configuration for a partition of the logical address space. The processing device can provide, to the host system, an acknowledgement of receipt of the logical address granularity configuration.

9 Claims, 5 Drawing Sheets

| Partition Name 310 | Starting Address 320 | Address Length 330 | Purpose 340 | Logical Address Granularity 350 |
|---|---|---|---|---|
| Boot | 0 | 16,384 | Stores boot loader | 128 KB |
| System | 16,384 | 5,242,880 | Stores system and services files | 4 KB |
| Cache | 5,259,264 | 1,048,576 | Temporary memory extension | 4 KB |
| App | 6,307,840 | 16,777,216 | User application binaries | 4 KB |
| Appdata | 23,085,056 | 16,777,216 | User application data | 4 KB |
| Media | 39,862,272 | 22,637,728 | User media files | 512 KB |

FIG. 3

LOGICAL ADDRESS GRANULARITY CONFIGURATIONS FOR LOGICAL ADDRESS SPACE PARTITIONS

TECHNICAL FIELD

Embodiments of the disclosure relate generally to memory sub-systems, and more specifically, relate to implementing logical address granularity configurations for logical address space partitions.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a diagram of an example logical address space granularity configuration data structure, in accordance with some embodiments of the present disclosure.

DETAILED DESCRIPTION

Figure 1:
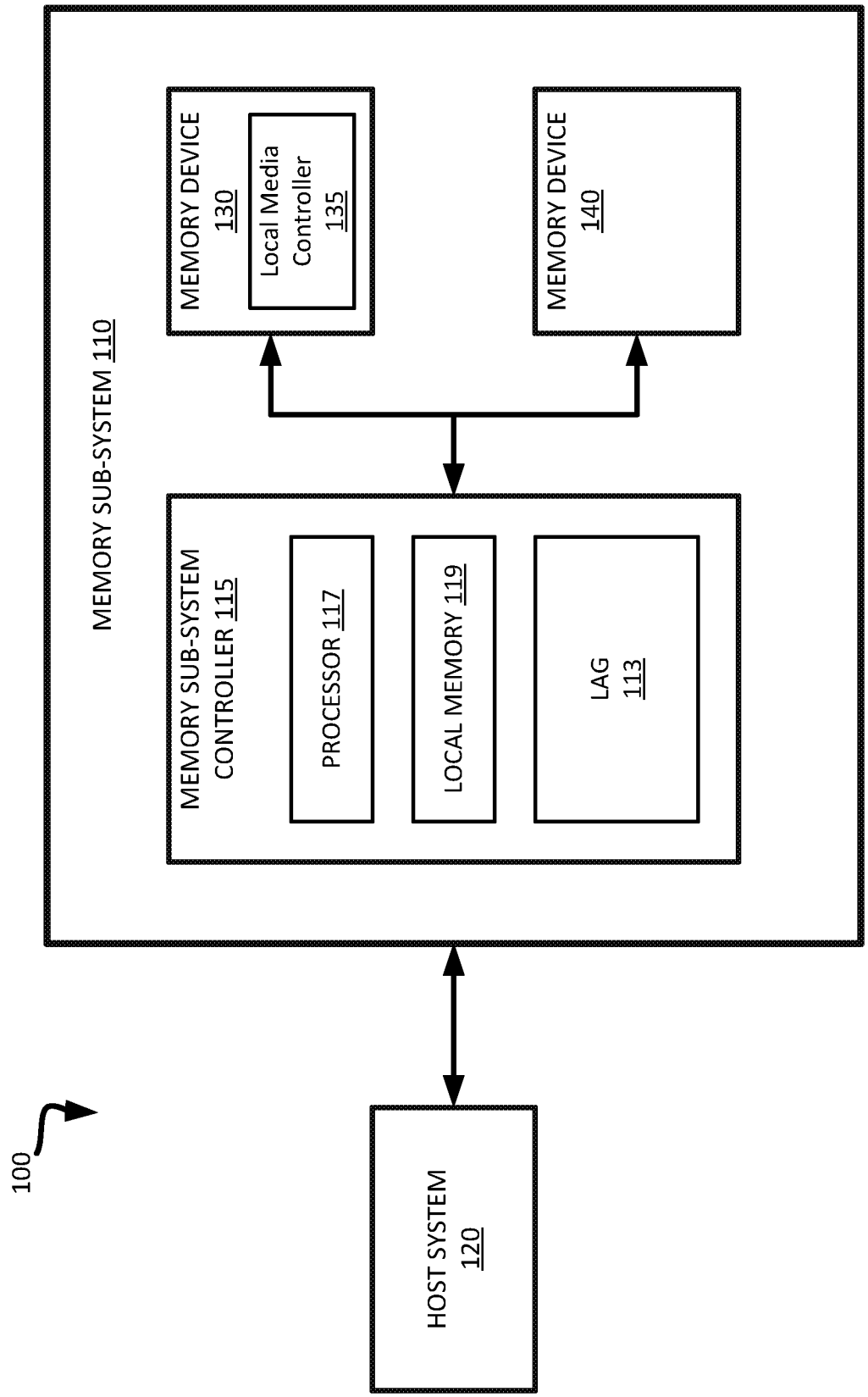
FIG. 1 illustrates an example computing system that includes a memory sub-system, in accordance with some embodiments of the present disclosure.

Aspects of the present disclosure are directed to implementing logical address granularity configurations for logical address space partitions. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more memory planes ("planes"). For some types of non-volatile memory devices (e.g., NAND devices), each plane consists of a set of physical blocks ("blocks"). Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. The memory cells are formed onto a silicon wafer in an array of columns (also referred to as bitlines) and rows (also referred to as wordlines). A wordline can refer to one or more rows of memory cells of a memory device that are used with one or more bitlines to generate the address of each of the memory cells. The intersection of a bitline and wordline constitutes the address of the memory cell. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell can be programmed (written to) by applying a certain voltage to the memory cell, which results in an electric charge being held by the memory cell. For example, a voltage signal $V_{CG}$ that can be applied to a control electrode of the cell to open the cell to the flow of electric current across the cell, between a source electrode and a drain electrode. More specifically, for each individual memory cell (having a charge Q stored thereon) there can be a threshold control gate voltage $V_T$ (herein also referred to as the "threshold voltage" or simply as "threshold") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The memory cells can, therefore, be characterized by a distribution P of the threshold voltages, $P(Q, V_T)=dW/dV_T$, where dW represents the probability that any given cell has its threshold voltage within the interval $[V_T, V_T+dV_T]$ when charge Q is placed on the cell.

A memory device can have distributions $P(Q, V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the memory cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

One type of memory cell ("cell") is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use 2n levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of memory cells.

A memory device of a memory sub-system can have a logical address space including logical addresses. For example, in the case of NAND memory devices, the logical addresses can include logical block addresses (LBAs). The logical address space can be divided into a number of partitions. Each partition provides for a logical representation of a respective portion of the memory device. Each partition can be assigned a logical identifier, which is used by a host system to identify the partition when the memory sub-system is operatively coupled to the host system using a suitable interface standard. For example, each partition can a logical unit assigned a respective logical unit number (LUN).

Upon receiving a media access command from the host system designating a logical address (e.g., read command, write command, un-mapping command), a controller of the memory sub-system can translate the logical address into a corresponding physical address of the memory device to handle the media access command. For example, the logical identifier can be associated with a plane of the memory device, and each plane can include a number of physical translation units (PTUs). A PTU corresponds to a base granularity of data managed by the memory device. For example, each PTU can correspond to a physical address, which defines a physical location of the memory device with respect to a particular logical identifier and plane.

To translate the logical address, the controller can utilize a logical-to-physical (L2P) mapping data structure (e.g., L2P mapping table) that maintains a mapping of logical addresses to physical addresses. The controller can store the L2P mapping data structure using volatile memory (e.g., DRAM or SRAM). For example, the volatile memory can be referred to as L2P cache. In some implementations, the L2P mapping table maintains a one-to-one mapping between logical addresses and respective physical addresses for "fine-grained L2P mapping" (e.g., a single logical address mapped to a single physical address).

There may be benefits to employing a L2P mapping data structure that supports coarser-grained L2P mappings, in which the L2P mapping data structure references multiple logical addresses with a single pointer, such as two LBAs, four LBAs, the size of a page of the memory device, etc. For example, there may be a waste of resource consumption to using a fine-grained L2P mapping for partitions that are known, via communication from the host system, to have a more coarse-grained basic input/output (I/O) command size. Illustratively, if a host system knows that all reads/writes to a partition will be 64 kilobytes (KB) aligned, then the controller can safely use a single L2P pointer to point to 64 KB of host data, or eight LBAs instead of one LBA driving improved device management efficiency for that LUN.

There can, however, be increased resource consumption and expense to using L2P mapping data structures that support coarser-grained L2P mapping, such as if the write workload is regularly smaller than the L2P mapping granularity. For example, read, modify, write (RMW) operations may be implemented in conjunction with using these L2P mapping data structure, which can impact memory sub-system performance, increase energy consumption, and contribute to write amplification. Accordingly, using L2P mapping data structure that support coarser-grained L2P mapping by default can contribute to increased resource consumption and decreased memory sub-system performance.

Aspects of the present disclosure address the above and other deficiencies by providing a memory sub-system that implements logical address granularity configurations for partitions. For example, a host system can be operatively coupled to the memory sub-system. Embodiments described herein provide for a mechanism that can enable the host system to provide information notifying the memory sub-system that a given partition of the logical address space will have primarily a write workload of a given size (e.g., 4 KB, 8 KB, 16 KB). The memory sub-system can use the information provided by the host system to map, for a partition, logical addresses to physical addresses using a coarse L2P mapping granularity (e.g., more than one logical address per pointer) that can be as large as the write workload. The information can be defined in view of an intended use of the partition to determine when it is appropriate to use a coarse L2P mapping granularity. The mechanism can be implemented as an extension of an interface specification (e.g., UFS).

For example, the memory sub-system can receive, from the host system, a request for usable capacity information for a logical address space. The memory sub-system can provide the usable capacity information in response to receiving the request for the usable capacity information. The memory sub-system can receive, from the host system, a request for supported logical address granularity information from configuration descriptors. The memory sub-system can provide the supported logical address granularity information in response to receiving the request for the supported logical address granularity information. The host system can generate a granularity configuration data structure (e.g., granularity configuration table). The granularity configuration data structure can maintain a logical address granularity configuration for each partition. For each partition in the granularity configuration data structure, the memory sub-system can receive a respective logical address granularity configuration from the host system. For each logical address granularity configuration, the memory sub-system can send an acknowledgment back to the host system acknowledging receipt of the logical address granularity configuration. The memory sub-system can then employ a L2P mapping data structure with a mapping granularity as configured by the granularity configuration data structure. Further details regarding implementing logical address granularity configurations for partitions are described below with reference to FIGS. 1-5.

Advantages of the present disclosure include, but are not limited to, reduced overhead and improved performance in the memory sub-system. For example, embodiments described herein can reduce the size of L2P data structures, which reduces total overhead requirements, improves QoS and steady-state performance, and increases memory device endurance. As another example, embodiments described herein can increase L2P storage (e.g., L2P cache) efficiency. For example, the same number of bytes dedicated to L2P storage can be used to map a greater fraction of the total logical address space, which can lead to improved read performance (e.g., increased L2P cache hit rate).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a logical address granularity component (LAG) 113. In some embodiments, the memory sub-system controller 115 includes at least a portion of the LAG 113. In some embodiments, the LAG component 113 is part of the host system 110, an application, or an operating system. In other embodiments, local media controller 135 includes at least a portion of LAG component 113 and is configured to perform the functionality described herein. The LAG 113, in conjunction with the host system 120, is configured to implement granularity configurations for partitions of a logical address (e.g., LBA) space. Further details regarding implementing granularity configurations for partitions will now be described below with reference to FIG. 2.

Figure 2:
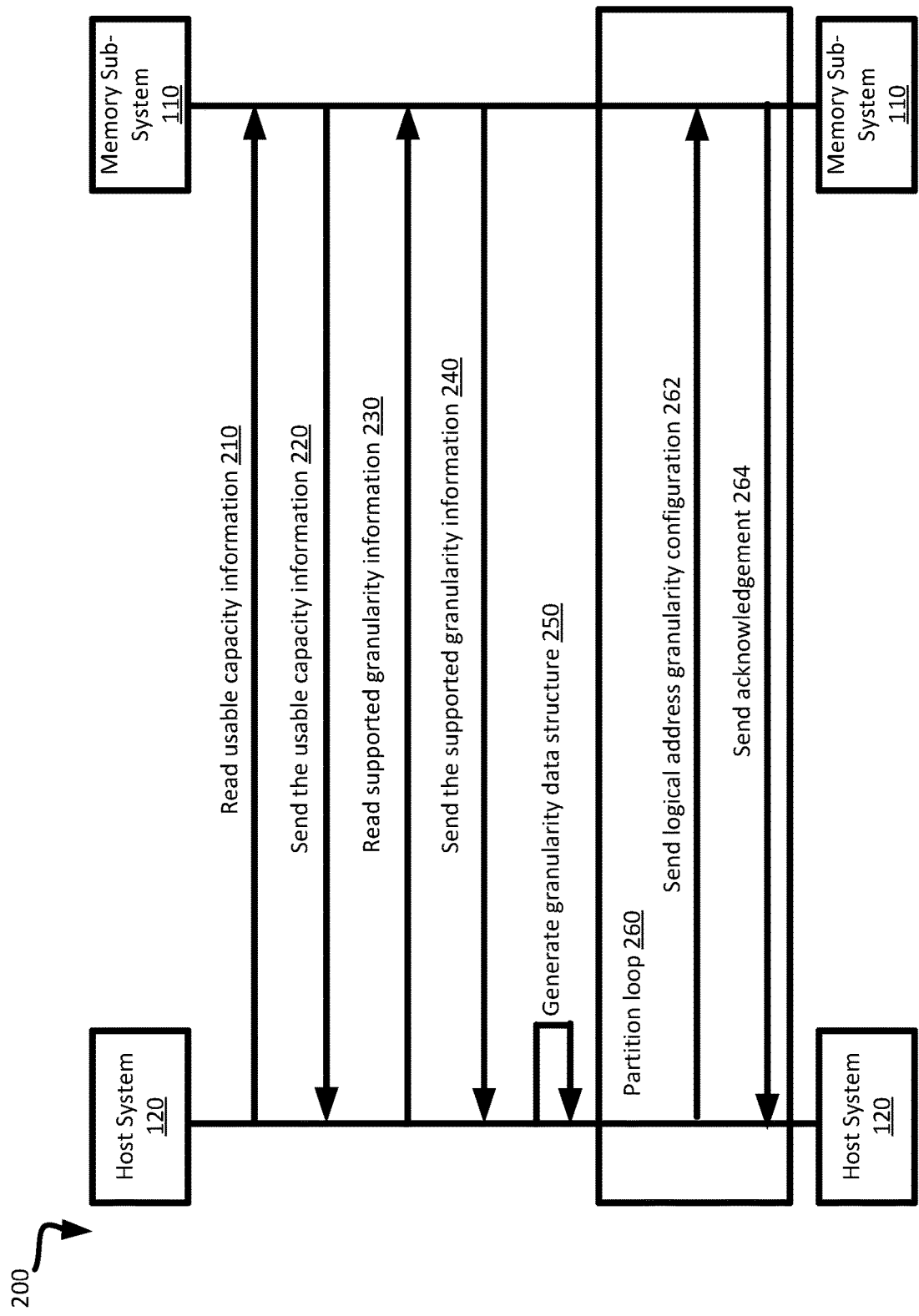
FIG. 2 is a timing diagram of an example interaction between a host system and a memory sub-system for implementing granularity configurations for logical address space partitions, in accordance with some embodiments of the present disclosure.

FIG. 2 is a timing diagram 200 an example interaction between the host system 120 and the memory sub-system 110 (e.g., LAG 113) for implementing logical address granularity configurations for logical address space partitions, in accordance with some embodiments of the present disclosure. As shown, at step 210, the memory sub-system 110 can receive a request from the host system 120 to read usable capacity information for a logical address space of a memory device of the memory sub-system 110 (e.g., memory device 130). The logical address space can include a number of logical addresses. In some embodiments, the logical addresses include logical block addresses ("LBAs"). The logical address space can be divided into a number of partitions. Each partition can be associated with a respective identifier. For example, each partition can be a logical unit associated with a respective logical unit number (LUN).

At step 220, the memory sub-system 110 can send the usable capacity information to the host system 120. At step 230, the memory sub-system 110 can receive, from the host system 120, a request to read supported logical address granularity information from the memory sub-system 110. At step 240, the memory sub-system 110 can send the supported logical address granularity information in response to receiving the request.

In some embodiments, the usable capacity information and the supported logical address granularity information can include device descriptor data and partition descriptor data. For example, if the memory sub-system 110 is a UFS drive, then the device descriptor data can be UFS device descriptor data. The device descriptor data can include a first device descriptor field by which the memory sub-system controller 115 can advertise host-configured logical address granularity, and a second device descriptor field indicative of a supported logical address granularity type. Examples of supported logical address granularity types include single LBA granularity (e.g., 4 KB), two LBA granularity (e.g., 8 KB), four LBA granularity (e.g., 16 KB), eight LBA granularity (e.g., 32 KB), 16 LBA granularity (e.g., 64 KB), 32 LBA granularity (e.g., 128 KB), 64 LBA granularity (e.g., 256 KB) and 128 LBA granularity (e.g., 512 KB). The partition descriptor data can include a partition descriptor field indicating a logical address granularity configuration for a partition. For example, the partition descriptor field can indicate if a partition is configured to the single LBA granularity, the two LBA granularity, the four LBA granularity, etc.

The logical address granularity configuration can be obtained by adding a bit to the first device descriptor field, adding a byte to the second device descriptor field indicative of supported logical address granularity types, and adding a byte to the partition descriptor field. Illustratively, with respect to the second device descriptor field, a bit meaning of "0" can indicate that granularity is supported for a single LBA (e.g., 4 KB), a bit meaning of "1" can indicate that granularity is supported for two LBAs (e.g., 8 KB), ..., a bit meaning of "7" can indicate that granularity is supported for 128 LBAs (e.g., 512 KB). With respect to the partition descriptor field, a bit meaning of "00 h" can indicate that the partition is configured for single LBA granularity (e.g., 4 KB), a bit meaning of "01 h" can indicate that the partition is configured for two LBA granularity (e.g., 8 KB), a bit meaning of "02 h" can indicate that the partition is configured for four LBA granularity (e.g., 16 KB), a bit meaning of "04 h" can indicate that the partition is configured for eight LBA granularity (e.g., 32 KB), a bit meaning of "08 h" can indicate that the partition is configured for 16 LBA granularity (e.g., 64 KB), a bit meaning of "10 h" can indicate that the partition is configured for 32 LBA granularity (e.g., 128 KB), a bit meaning of "20 h" can indicate that the partition is configured for 64 LBA granularity (e.g., 256 KB), and a bit meaning of "30 h" can indicate that the partition is configured for 128 LBA granularity (e.g., 512 KB).

Upon receiving the device descriptor data, the host system 120 can determine whether the memory sub-system 110 supports a logical address granularity configuration (e.g., by checking the first device descriptor field). If so, the host system 120 can read the second device descriptor field to determine available supported granularities of the logical address granularity configuration. The host system 120 can then, for a partition to be configured, issue a second request (e.g., command) to the memory sub-system 110 with descriptor data for the partition to be configured. The second request can include an appropriate logical address granularity configuration for the partition to be configured. In response to receiving and executing the second request, the memory sub-system 110 can provide, to the host system 120, a second response indicating a successful status. The process can be repeated for any suitable number of partitions to be configured.

In response to receiving the supported logical address granularity information, the host system 120 can generate a granularity configuration data structure (e.g., a table) at step 250. The granularity configuration data structure can maintain logical address granularity configurations for respective ones of the partitions. An illustrative example of a granularity configuration data structure maintaining logical address granularity configurations will be described below with reference to FIG. 3.

After generating the granularity configuration data structure, a partition loop 260 can be initiated. During the partition loop 260, the memory sub-system 110 can, at step 262, receive a logical address granularity configuration for a partition specified within the granularity configuration data structure from the host system 120. At step 264, the memory sub-system 110 can send an acknowledgment of receipt of the logical address granularity configuration for the partition to the host system 120. The partition loop 260 can continue until a logical address granularity configuration is sent for each partition.

After the partition loop is completed, the host system 120 can send a request (e.g., command) to the memory sub-system 110 to finalize the logical address granularity configurations, and the memory sub-system 110 can finalize the logical address granularity configurations. For example, the request can include a request to write to a configuration descriptor setting. In response to receiving and executing the request, the memory sub-system 110 can send an acknowledgment that the finalizing is complete to the host system 120. Accordingly, the host system 120 can, in conjunction with the memory sub-system 110, configure a logical address granularity setting for each partition.

The memory sub-system 110 can perform a memory access operation (e.g., read operation or write operation) using the logical address granularity configurations. For example, for command to perform the memory access operation received from the host system 120, the memory sub-system 110 can convert a logical address (e.g., LBA) into a corresponding physical address using a L2P mapping data structure associated with the partitions (e.g., LUNs). More specifically, the L2P mapping data structure can have a mapping granularity as configured in the granularity configuration data structure. The memory sub-system 110 can then use that information to perform the write command or the read command.

For a write command designating a partition, a starting address (e.g., starting LBA), an address length ("length") and data to be written, the memory sub-system 110 can determine whether head data of the data to be written and tail data of the data to be written is aligned to the granularity configuration of the partition. For example, head data is aligned if the starting address is an integer multiple of the logical address granularity of the partition, and tail data is aligned if the tail address (i.e., address corresponding to the starting address plus length) is an integer multiple of the logical address granularity of the partition. Illustratively, if the logical address granularity is 4 LBAs (e.g., 16 KB), then the head data is aligned if the starting address is an integer multiple of 4 LBAs, and the tail data is aligned if the tail address is an integer multiple of 4 LBAs.

If the head data and the tail data are both aligned, then the memory sub-system controller can write the data directly to the memory device. Otherwise, if the head data and/or the tail data is unaligned with respect to the logical address granularity of the partition, then the memory sub-system 110 can perform read/modify/write (RMW) updates. For example, if the head data is determined to be unaligned with respect to the logical address granularity of the partition, then the memory sub-system 110 can perform an aligned read to obtain aligned head data by reading aligned head data from the memory device into a buffer, merging in new data from the write command to the buffer to obtain read/modified head data, and writing the read/modified head data to the memory device 130. If the tail data is determined to be unaligned with respect to the logical address granularity of the partition, then the memory sub-system 110 can perform an aligned read to obtain aligned tail data by reading aligned tail data from the memory device into a buffer, merging in new data from the write command to the buffer to obtain read/modified tail data, and writing the read/modified tail data to the memory device. The memory sub-system 110 can update the logical to physical mapping table for the associated partition, and then return a write command status to the host system 120.

Illustratively, assume in the following write command examples that a partition is "LUN 2" and the logical address granularity of LUN 2 is 4 LBAs (e.g., 16 KB). If the starting LBA is 16 and the length is 4, then the head data and the tail data are each aligned with respect to the logical address granularity since the starting LBA of 4 and the tail LBA of 20 are each integer multiples of 4. As such, the memory sub-system 110 can cause data to be written directly to the memory device to a physical address A. The memory sub-system 110 can update, using the starting LBA 16 and the logical address granularity, the corresponding entry of the L2P mapping data structure to the physical address A. The memory sub-system 110 can then return the write command status to the host system 120.

If the starting LBA is 10 and the length is 6, then the head data is unaligned with respect to the logical address granularity of LUN 2 since the starting LBA is not an integer multiple of 4. The memory sub-system 110 can, using the starting LBA 10 and the logical address granularity, look up aligned head data from a second entry of the L2P mapping data structure corresponding to a physical address B. The memory sub-system 110 can read 16 KB of data from the physical address B, which includes the current versions of LBAs 8-11. The new LBA 10 and LBA 11 data can be merged into the buffer so it contains the previous LBA 8 and LBA 9 data, and the new LBA 10 and LBA 11 data. The memory sub-system 110 can write this new 16 KB of data to a new physical address C, and write the aligned inner portion LBAs 12-15 to a new physical address D. The tail data is aligned with respect to the logical address granularity since the tail address is an integer multiple of 4. Since the tail data is aligned, nothing needs to be done with the tail data. The memory sub-system 110 can update, using LBA 8 and the logical address granularity, the corresponding entry of the L2P mapping data structure to the physical address C. The memory sub-system 110 can then update, using LBA 12 and the logical address granularity, the corresponding entry of the L2P mapping data structure to the physical address D. The memory sub-system 110 can then return the write command status to the host system 120.

If the starting LBA is 15 and the length is 1, then the head data is unaligned with respect to the logical address granularity of LUN 2 since the starting address is not an integer multiple of 4. The tail data alignment is irrelevant in this scenario since the tail data is covered by the head data (i.e., there is no tail data portion. The memory sub-system 110 can look up LBA 12 data in the L2P mapping data structure and read data from 4 LBAs into a buffer, merge in the new LBA 15 data, and write the new LBA 15 data to a new physical address E. The memory sub-system 110 can update, using LBA 12 and the logical address granularity, the corresponding entry of the L2P mapping data structure to the physical address E. The memory sub-system 110 can then return the write command status to the host system 120.

For a read command designating a partition (e.g., LUN), a starting address (e.g., starting LBA) and a length, the memory sub-system 110 can similarly determine head data alignment and tail data alignment with respect to the granularity configuration for the partition, as described above. Regarding unaligned head data, the memory sub-system 110 can look up an entry in the L2P mapping data structure for the head address, offset appropriately from the entry, read the requested data, and transfer unaligned head data. As needed, the memory sub-system 110 can loop through looking up entries in the L2P mapping data structure, reading the requested data, and transferring the associated fully aligned data with respect to the granularity configuration. Regarding unaligned tail data, the memory sub-system 110 can look up the entry in the L2P mapping data structure for the tail address, read an appropriate amount of data, transfer the appropriate amount of data, and return a read command status to the host system 120. Accordingly, for unaligned data, an offset may be needed to ensure that only requested data is transferred to the host system 120.

Illustratively, assume in the following read command example that a partition is "LUN 2" and the logical address granularity is 4 LBAs (e.g., 16 KB). If the starting LBA is 10 and the length is 13, then the head data and the tail data are each unaligned with respect to the granularity configuration of LUN 2 since the head address and the tail address (LBA 10 and LBA 23 respectively) are each not integer multiples of 4. The aligned head address is LBA 8 and the aligned tail address starts at LBA 20. For the unaligned head data, the memory sub-system 110 can look up, using LBA 8 and the logical address granularity, the corresponding entry in the L2P mapping data structure. The memory sub-system 110 can offset 8 KB from the corresponding physical address, read data from LBAs 10 and 11, and transfer the data to the host system 120. The memory sub-system 110 can loop through the aligned portion. For example, the memory sub-system 110 can look up, using LBA 12 and the logical address granularity, the corresponding entry in the L2P mapping data structure, read 16 KB of data, and transfer the 16 KB of data to the host system 120. For LBA 16, The memory sub-system 110 can look up, using LBA 16 and the logical address granularity, the corresponding entry in the L2P mapping data structure, read 16 KB of data, and transfer the 16 KB of data to the host system 120. For the unaligned tail data, the memory sub-system 110 can look up, using LBA 20 and the logical address granularity, the corresponding entry in the L2P mapping data structure, read 12 KB of data from LBAs 20-22, and transfer the data to the host system 120. The memory sub-system 110 can then return the read command status to the host system 120.

FIG. 3 is a diagram of an example logical address space granularity configuration data structure ("granularity configuration data structure") 300, in accordance with some embodiments of the present disclosure. In some embodiments, and in this illustrative example, the granularity configuration data structure 300 is a table.

As shown, the granularity configuration data structure 300 includes a number of columns 310-350. Column 310 is named "Partition Name" and includes the names of respective partitions, column 320 is named "Starting Address" and includes the starting addresses (e.g., LBAs) of the respective partitions, column 330 is named "Address Length" and includes the lengths of the respective partitions, column 340 is named "Purpose" and includes descriptions of the purpose of the respective partitions, and column 350 is named "Logical Address Granularity" and includes the logical address granularity configured for the respective partitions. It is assumed in this illustrative example that the total number of addresses (e.g., LBAs) is 62,500,000 and the total capacity of the memory device is 256 GB.

For example, the first row of the granularity configuration data structure 300 corresponds to a "boot" partition having a purpose of storing a boot loader. The granularity configuration data structure 300 indicates that the boot partition has a starting address of 0, a length of 16,384 and a logical address granularity of 128 KB (e.g., 32 LBA granularity supported for the boot partition). The boot image can be read and written atomically.

The second row of the granularity configuration data structure 300 corresponds to a "system" partition having a purpose of storing system and service files. The granularity configuration data structure 300 indicates that the system partition has a starting address of 16,384 (i.e., the ending address of the boot partition), a length of 5,242,880 and a logical address granularity of 4 KB (e.g., single LBA granularity supported for the system partition). The system and service files may be small, and updated and/or read independently.

The third row of the granularity configuration data structure 300 corresponds to a "cache" partition having a purpose defining a temporary memory extension. For example, the cache partition can serve as a temporary virtual memory and/or DRAM extension. The granularity configuration data structure 300 indicates that the cache partition has a starting address of 5,259,264 (i.e., the ending address of the system partition), a length of 16,777,216 and a logical address granularity of 4 KB (e.g., single LBA granularity supported for the cache partition). For example, the logical address granularity for the cache partition can be aligned to low-power DRAM (LPDRAM) page size.

The fourth row of the granularity configuration data structure 300 corresponds to an "app" partition having a purpose defining user application binaries. The granularity configuration data structure 300 indicates that the app partition has a starting address of 6,307,840 (i.e., the ending address of the cache partition), a length of 16,777,216 and a logical address granularity of 4 KB (e.g., single LBA granularity supported for the app partition). The user application binaries may be small, and updated and/or read independently.

The fifth row of the granularity configuration data structure 300 corresponds to an application data ("appdata") partition having a purpose defining user application data. The granularity configuration data structure 300 indicates that the appdata partition has a starting address of 23,085,056 (i.e., the ending address of the app partition), a length of 16,777,216 and a logical address granularity of 4 KB (e.g., single LBA granularity supported for the appdata partition). The appdata partition can be associated with unpredictable I/O access patterns.

The sixth row of the granularity configuration data structure 300 corresponds to a "media" partition having a purpose defining user media files (e.g., audio files, visual files, audiovisual files). The granularity configuration data structure 300 indicates that the media partition has a starting address of 39,862,272 (i.e., the ending address of the appdata partition), a length of 22,637,728 and a logical address granularity of 512 KB (e.g., 128 LBA granularity supported for the media partition). Large media files can be read/written sequentially.

Figure 4:
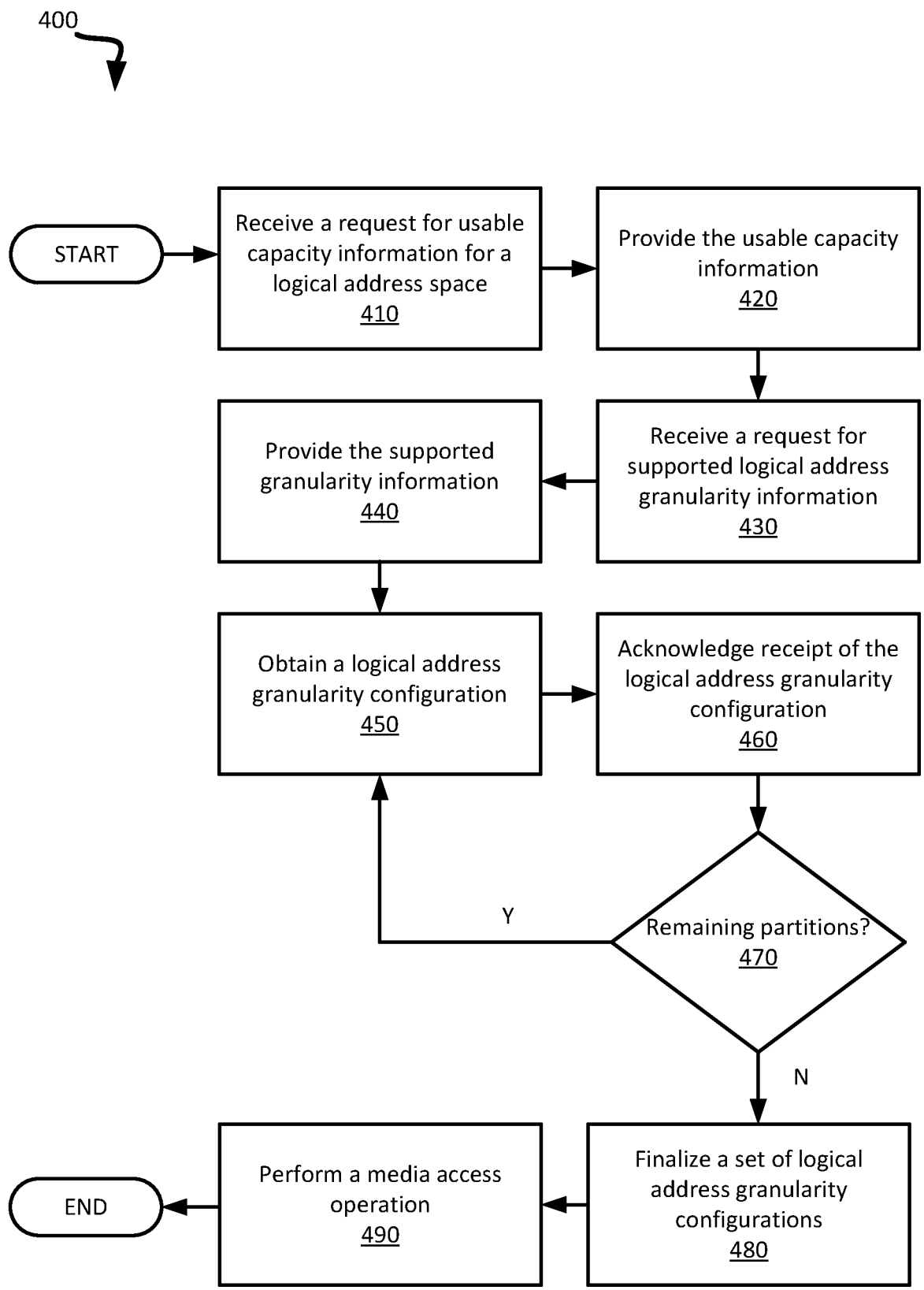
FIG. 4 is a flow diagram of an example method for implementing granularity configurations for logical address space partitions, in accordance with some embodiments of the present disclosure.

FIG. 4 is a flow diagram of an example method for implementing granularity configurations for logical address space partitions, in accordance with some embodiments of the present disclosure. The method 400 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory sub-system 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a request for usable capacity information for the logical address space is received and, at operation 420, the usable capacity information is provided. For example, control logic can receive the request for usable capacity information from a host system, and can provide the usable capacity information to the host system in response to receiving the request.

For example, the logical address space can include a number of logical addresses of a memory device of a memory sub-system operatively coupled to the host system. In some embodiments, the logical addresses include logical block addresses ("LBAs"). The logical address space can be divided into a set of partitions. Each partition can be associated with a respective identifier. For example, each partition can be a logical unit associated with a respective logical unit number (LUN).

At operation 430, a request for supported logical address granularity information is received and, at operation 440, the supported logical address granularity information is provided. For example, control logic can receive the request for supported logical address granularity information from the host system, and provide, for each partition, the supported logical address granularity information to the host system in response to receiving the request.

In some embodiments, the usable capacity information and the supported logical address granularity information can include device descriptor data and partition descriptor data. For example, in the case of a UFS drive, then the device descriptor data can be UFS device descriptor data. The device descriptor data can include a first device descriptor field by which the memory sub-system can advertise host-configured logical address granularity, and a second device descriptor field indicative of a supported logical address granularity type. Examples of supported logical address granularity types include single LBA granularity (e.g., 4 KB), two LBA granularity (e.g., 8 KB), four LBA granularity (e.g., 16 KB), eight LBA granularity (e.g., 32 KB), 16 LBA granularity (e.g., 64 KB), 32 LBA granularity (e.g., 128 KB), 64 LBA granularity (e.g., 256 KB) and 128 LBA granularity (e.g., 512 KB). The partition descriptor data can include a partition descriptor field indicating a logical address granularity configuration for a partition. For example, the partition descriptor field can indicate if a partition is configured to the single LBA granularity, the two LBA granularity, the four LBA granularity, etc.

At operation 450, a logical address granularity configuration is received and, at operation 460, an acknowledgement of receipt of the logical address granularity configuration is provided. For example, control logic can obtain the logical address granularity configuration for a partition from the host system, and provide the acknowledgment to the host system.

At operation 470, it is determined whether there are any remaining partitions. For example, control logic can determine whether there includes at least one partition for which a logical address granularity configuration has not been received. If so, the process can revert back to operation 450 to obtain another logical address granularity configuration for a remaining partition.

Otherwise, if there are no remaining partitions, this means that there are no more logical address granularity configurations left to receive from the host system. At operation 480, a set of logical address granularity configurations is finalized. For example, control logic can finalize the set of logical address granularity configurations in response to receiving a request (e.g., command) from the host system to finalize the partition configuration, and can provide the host system an acknowledgement upon completing the finalizing. For example, the request can include a request to write to a configuration descriptor setting.

At operation 490, a memory access operation can be performed. For example, control logic can cause the memory access operation to be performed based on the set of logical address granularity configurations. More specifically, the memory access can be performed using a L2P mapping data structure (e.g., table) having, for each partition, a logical address granularity determined in accordance with the set of logical address granularity configuration. In some embodiments, the memory access operation is a write operation. In some embodiments, the memory access operation is a read operation. Further details regarding operations 410-490 are described above with reference to FIGS. 1-3.

Figure 5:
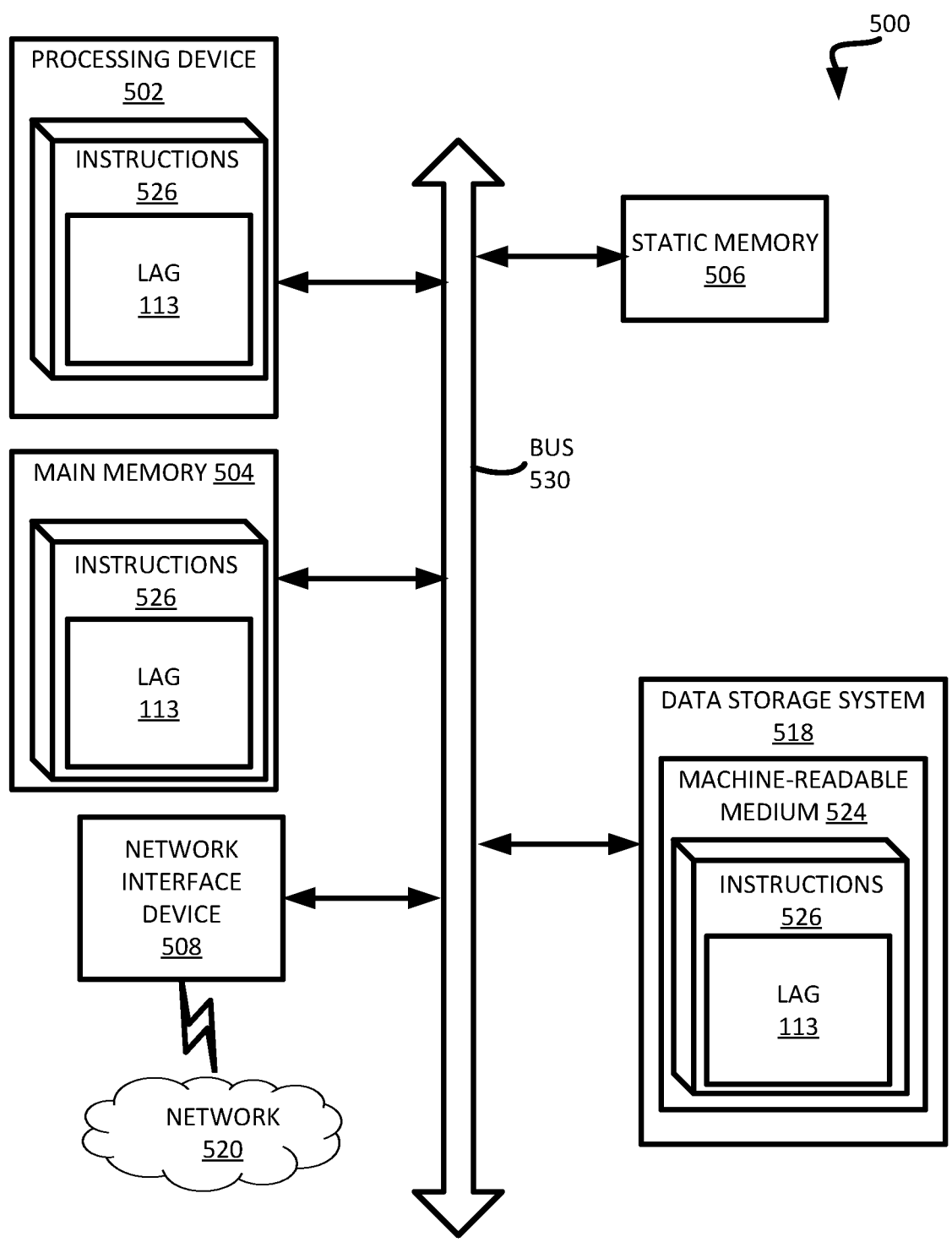
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the LAG 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In some embodiments, the instructions 526 include instructions to implement functionality corresponding to a logical address granularity component (e.g., the logical address granularity component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
 a memory device associated with a logical address space; and
 a processing device, operatively coupled with the memory device, to perform operations comprising:
  providing, to a host system, device descriptor data for the memory device, the device descriptor data comprising:
   a first field indicating that a memory sub-system supports at least one logical address granularity configuration for the logical address space; and
   a second field specifying at least one available supported granularity of the at least one logical address granularity configuration for the logical address space;
  obtaining, from the host system, a logical address granularity configuration for a partition of a set of partitions of the logical address space, wherein the logical address granularity configuration for the partition is located within a data structure that maintains the logical address granularity configuration for the partition, and a size of the partition defined by an address length for the partition that is represented by a number of addresses beginning from a starting address of the partition;
  providing, to the host system, an acknowledgement of receipt of the logical address granularity configuration for the partition, wherein the logical address granularity configuration for the partition is specified by partition descriptor data comprising a third field;
  receiving a command to perform a memory access operation corresponding to the partition;
  in response to receiving the command, determining head data alignment and tail data alignment based on the logical address granularity configuration for the partition and the size of the partition; and
  causing the memory access operation to be performed based on the head data alignment and the tail data alignment.

2. The system of claim 1, wherein the partition comprises at least one of: a boot partition, a system partition, a cache partition, an application partition, an application data partition, or a media partition.

3. The system of claim 1, wherein the operations further comprise:
 finalizing a set of logical address granularity configurations comprising the logical address granularity configuration; and
 causing the memory access operation to be performed based on the set of logical address granularity configurations.

4. A method comprising:
 providing, by a processing device to a host system, device descriptor data for a memory device associated with a logical address space, the device descriptor data comprising:
  a first field indicating that a memory sub-system supports at least one logical address granularity configuration for the logical address space; and
  a second field specifying at least one available supported granularity of the at least one logical address granularity configuration for the logical address space;
 obtaining, by the processing device from the host system, a logical address granularity configuration for a partition of a set of partitions of the logical address space, wherein the logical address granularity configuration for the partition is located within a data structure that maintains the logical address granularity configuration for the partition, and a size of the partition defined by an address length for the partition that is represented by a number of addresses beginning from a starting address of the partition;
 providing, by the processing device to the host system, an acknowledgement of receipt of the logical address granularity configuration for the partition, wherein the logical address granularity configuration for the partition is specified by partition descriptor data comprising a third field;
 receiving, by the processing device, a command to perform a memory access operation corresponding to the partition;
 in response to receiving the command, determining, by the processing device, head data alignment and tail data alignment based on the logical address granularity configuration for the partition and the size of the partition; and causing, by the processing device, the memory access operation to be performed based on the head data alignment and the tail data alignment.

5. The method of claim 4, wherein the partition comprises at least one of: a boot partition, a system partition, a cache partition, an application partition, an application data partition, or a media partition.

6. The method of claim 4, further comprising:
finalizing, by the processing device, a set of logical address granularity configurations comprising the logical address granularity configuration; and
causing, by the processing device, a memory access operation to be performed based on the set of logical address granularity configurations.

7. A system comprising:
a memory device associated with a logical address space; and
a processing device, operatively coupled with the memory device, to perform operations comprising:
receiving, from a host system, a request for usable capacity information for the logical address space;
providing, to the host system, the usable capacity information;
receiving, from the host system, a request for supported logical address granularity information;
providing, to the host system, the supported logical address granularity information, wherein the usable capacity information and supported logical address granularity information comprise device descriptor data for the memory device, the device descriptor data comprising:
a first field indicating that a memory sub-system supports at least one logical address granularity configuration for the logical address space; and
a second field specifying at least one available supported granularity of the at least one logical address granularity configuration for the logical address space;
obtaining, from the host system, a logical address granularity configuration for a partition of a set of partitions of the logical address space, wherein the logical address granularity configuration for the partition is located within a data structure that maintains the logical address granularity configuration for the partition, and a size of the partition defined by an address length for the partition that is represented by a number of addresses beginning from a starting address of the partition; and
providing, to the host system, an acknowledgement of receipt of the logical address granularity configuration for the partition, wherein the logical address granularity configuration for the partition is specified by partition descriptor data comprising a third field receiving a command to perform a memory access operation corresponding to the partition;
in response to receiving the command, determining head data alignment and tail data alignment based on the logical address granularity configuration for the partition and the size of the partition; and
causing the memory access operation to be performed based on the head data alignment and the tail data alignment.

8. The system of claim 7, wherein the partition comprises at least one of: a boot partition, a system partition, a cache partition, an application partition, an application data partition, or a media partition.

9. The system of claim 7, wherein the operations further comprise:
finalizing a set of logical address granularity configurations comprising the logical address granularity configuration; and
causing a memory access operation to be performed based on the set of logical address granularity configurations.

* * * * *